Figure 1:
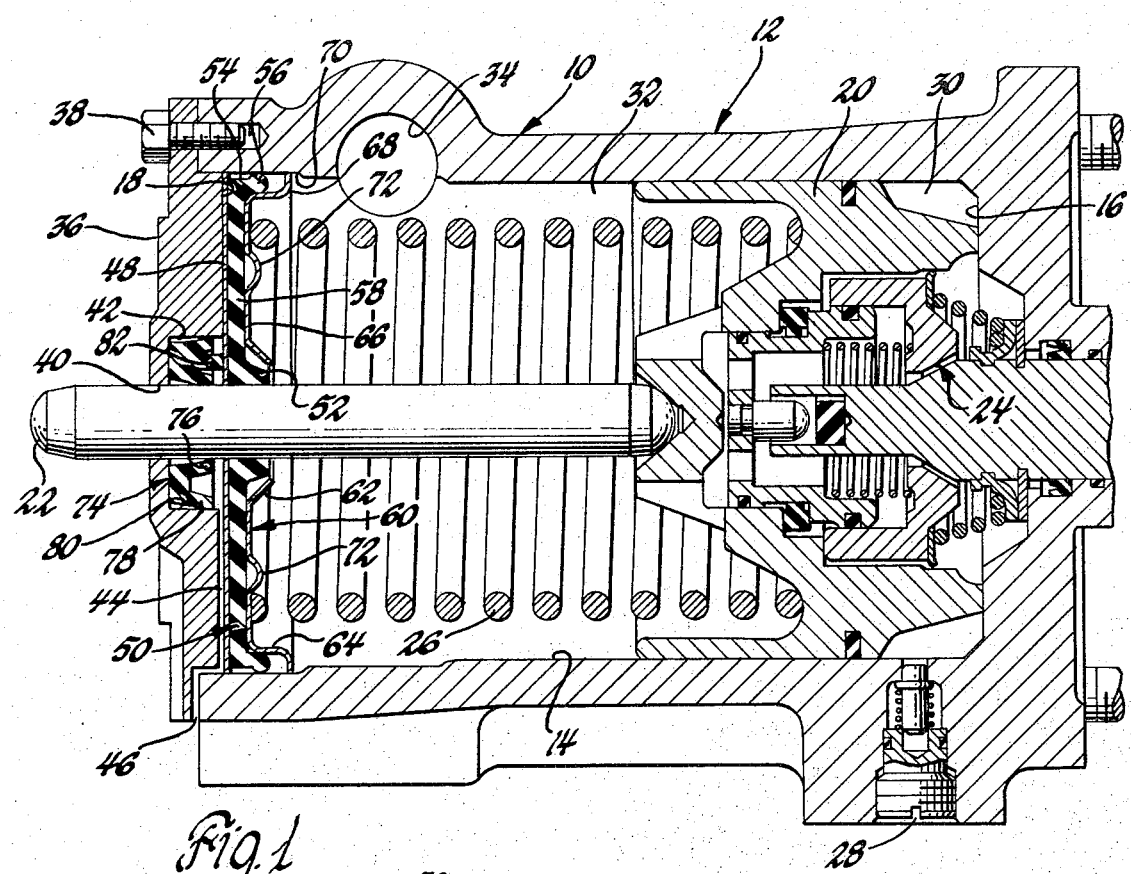

United States Patent [19]
Bennett et al.

[11] 3,841,204
[45] Oct. 15, 1974

[54] COMBINATION END COVER SEAL ARRANGEMENT

[75] Inventors: Ronald W. Bennett; James R. Baber, both of Miamisburg, Ohio

[73] Assignee: General Motors Corporation, Detroit, Mich.

[22] Filed: July 27, 1973

[21] Appl. No.: 383,399

[52] U.S. Cl............ 92/86, 92/168, 277/58, 277/188, 277/205
[51] Int. Cl..................... F01b 31/18, F16j 15/18
[58] Field of Search........ 92/168, 431; 277/58, 188, 277/189, 205

[56] References Cited
UNITED STATES PATENTS

| | | | |
|---|---|---|---|
| 2,549,818 | 4/1951 | Joy | 92/168 |
| 2,635,907 | 4/1953 | Heimbuch | 277/189 |
| 2,815,970 | 12/1957 | Wallace | 92/168 |
| 3,242,868 | 3/1966 | Gold | 92/168 |
| 3,434,727 | 3/1969 | Kollenberger | 277/58 |
| 3,699,680 | 10/1972 | Shellhouse | 91/431 |

*Primary Examiner*—Paul E. Maslousky
*Attorney, Agent, or Firm*—D. D. McGraw

[57] ABSTRACT

A hydraulic power cylinder is provided with a full diameter end seal through which the output force push rod extends. The seal covers the full face of the end cover, provides a static seal at the cylinder side wall, and a sliding seal on the push rod. It functions in conjunction with the seal expander plate to provide a vacuum seal around the push rod so that the hydraulic cylinder can be evacuated of air during the hydraulic fluid filling operation. The seal arrangement includes another annular seal which also fits around push rod and wipes the push rod to prevent fluid from being transferred along the push rod to the exterior of the hydraulic cylinder.

2 Claims, 2 Drawing Figures

PATENTED OCT 15 1974  3,841,204

COMBINATION END COVER SEAL ARRANGEMENT

The invention relates to an end cover seal arrangement for a hydraulic power cylinder, and more particularly to one which covers the full face of the end cover, provides a static seal on its outer diameter, and a sliding seal on its inner diameter, the hydraulic power cylinder push rod extending through the seal and the end cover. The seal cooperates with a seal expander plate to provide a vacuum seal around the push rod so that the hydraulic power cylinder can be evacuated of air during the hydraulic fluid filling operation. The arrangement also includes another annular seal fitted in a recess in the end cover and having concentric inner and outer frusto-conical lips, the inner one wiping the push rod during movement of the push rod to prevent any hydraulic fluid from flowing along the push rod exteriorly of the hydraulic power cylinder. The outer lips seals against the side wall of the recess. Horizontally extending lip segments located radially between the inner and outer lips of this seal abut a seal support plate for the other seal so that the seal in the recess maintains its sealed position at all times. A groove is provided in the face of the end cover and is covered by the seal support plate, the groove opening to provide a vent for any hydraulic fluid passing the first seal and wiped off of the push rod by the second seal. The seal expander plate also acts as a spring seat for the hydraulic power cylinder piston return spring, the spring urging the seal expander into continual sealed expanding engagement with the first seal and also holding the seal support plate in place against the end cover.

Figure 2:
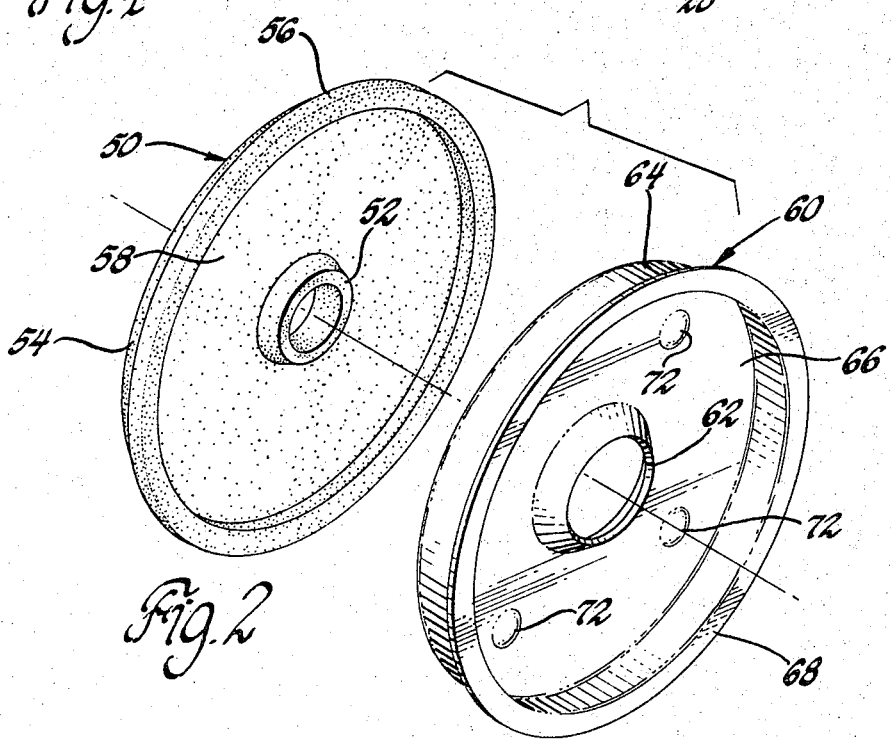

In the drawings:

FIG. 1 is a cross-section view with parts broken away, and shows a hydraulic power cylinder embodying the invention; and FIG. 2 is an expanded perspective view showing the full diameter seal and the seal expander plate.

The hydraulic power cylinder assembly 10 is of the type more particularly disclosed, described and claimed in U.S. Pat. No. 3,699,680, issued Oct. 24, 1972. The assembly includes a cylinder body 12 having a cylinder side wall 14 and opposed cylinder end walls 16 and 18. A piston 20 is reciprocably mounted in the cylinder and has a force transfer member, such as push rod 22, extending through the cylinder end wall 18 and out of the cylinder to actuate a suitable mechanism. When the hydraulic power cylinder is a brake booster assembly, the push rod 22 will actuate a brake master cylinder. A control valve assembly 24 is mounted in piston 20 and a portion of the cylinder body 12. The valve assembly illustrated is of the open center type more particularly described in the above noted patent. A piston return spring 26 is operatively seated on end wall 18 and acts on the piston 20 to urge the piston in the rightward, no-power position. In this position, hydraulic power fluid enters the assembly through pressure inlet 28, passing through the power chamber 30 defined by piston 20 and end wall 16, and through the open control valve assembly 24 and appropriate passages in piston 20 to the outlet chamber 32. The outlet chamber is defined by the cylinder side wall 14, end wall 18 and the piston 20. The fluid then passes out of the assembly through the outlet port 34. When the cylinder is energized, the control valve assembly 24 restricts the flow of fluid therethrough, causing a pressure to build up in power chamber 30 which acts on piston 20 to overcome the force of piston return spring 26 and moves the piston leftwardly as seen in FIG. 1. This causes the push rod 22 to move leftwardly to actuate a suitable mechanism such as a master cylinder. Upon release, the control valve assembly 24 opens and the pressure built up in power chamber 30 is dissipated, since the fluid is once again allowed to flow relatively unrestrictedly through the control valve assembly. The piston 20 then returns rightwardly as seen in FIG. 1 under influence of the force of piston return spring 26.

The cylinder end wall 18 is the inner surface of the end cover 36, which is suitably secured to the body 12 by means of bolts 38. End cover 36 has a center aperure 40 through which push rod 22 extends. A recess 42 is provided in the inner surface of end cover 36, is axially in alignment with the center aperture 40, and is somewhat larger than that aperture. A groove 44 in the inner surface of end cover 36 extends radially from recess 42 and terminates at the outer periphery of the end cover so as to provide a vent 46. When the cylinder assembly is in the installed position, vent 46 is preferably at the bottom side of the cylinder assembly. An annular seal support plate 48 covers end wall 18 on the outlet chamber side, also providing a cover for recess 42 and groove 44. The push rod 22 also extends through the seal support plate 48. The diagram seal 50 is provided with an inner frusto-conical lip 52 through which push rod 22 extends in sealing relation. It also has an outer, generally cylindrical lip 54 which terminates in an annular rolled edge 56, this edge being in sealing engagement with the cylinder side wall 14. The lips 52 and 54 are joined by a flat disc body section 58 which is in full surface engagement with the seal support plate 48.

The seal expander 60 is an annular stamped metal plate having an inner frusto-conical flange 62 aperture to freely receive push rod 22 therethrough. The seal expander has an outer peripheral flange 64 and a disc body section 66 joining flanges 62 and 64. The inner flange 62 is positioned outwardly of the seal inner lip 52 in radially spaced relation thereto so that the inner lip 52 of the seal may flex radially as necessary during the sealing operation, while cooperating with the inner flange 62 during hydraulic brake fluid filling operations utilizing the evacuation of air technique, without breaking the seal between inner lip 52 and the push rod 22. The seal expander outer flange 64 extends axially to provide radially outwardly acting support force to the outer lip 54 and the rolled edge 56 of seal 50, holding the seal rolled edge in sealing engagement with the cylinder side wall 14. Flange 64 terminates in a radially outward extending section 68 which is axially spaced from the seal rolled edge 56. The cylinder side wall 14 has a shoulder 70 formed thereon which effectively prevents the seal expander from moving axially for more than a very short distance toward the cylinder end wall 16, the inner diameter of shoulder 70 being smaller than the outer diameter of the radially outward extending flange section 68. The seal expander disc body section 66 is illustrated as being provided with several bumps 72 which extend toward piston 20 and aid in guiding one end of the piston return spring 26. This end of the piston return spring is provided with a spring seat by the portion of the disc body section 66 immediately adjacent the bumps 72. The force exerted by the piston return spring on the end wall 18 is transmitted to that end wall through the seal expander disc body section 66, the diaphragm seal disc body section 58, and the seal support plate 48.

An annular seal 74 is positioned in the end cover recess 42 and surrounds the push rod 22. The seal has an inner frusto-conical lip 76 which seals and wipes the push rod 22 free of any hydraulic fluid which may remain on the push rod after the push rod has been moved for a distance through the inner lip 52 of seal 50. Any hydraulic fluid removed by this wiping action will pass from the recess 42 through the groove 44 and out vent 46. This effectively prevents any possible contamination of the device actuated by push rod 22 with hydraulic fluid utilized in the hydraulic cylinder 10. Annular seal 74 also has an outer frusto-conical lip 78 which seals against the recess side wall 80. The base of seal 74 engages the bottom of recess 42. Seal 74 also has a plurality of circumferentially spaced lip segments 82 which extend axially toward and into engagement with the seal support plate 48. The seal 74 is thus retained in position by the seal support plate 48.

The seal arrangement provides a static seal at the outer periphery of seal 50. The seal 50 covers the full face of the end cover 36. A sliding lip seal on the inner diameter of seal 50, which cooperates to seal push rod 22 in its reciprocating action, also provides a vacuum seal in conjunction with the seal expander plate 60 so that the hydraulic cylinder can be evacuated of air during the hydraulic fluid filling operation. The arrangement also provides an outer seal 74 which further assures sealing the hydraulic fluid which is used in cylinder 10 against accidental mingling with another hydraulic device such as a master cylinder which is operated by the push rod 22. This is particularly important when different types of fluids may be used in the hydraulic cylinder 10 and such a master cylinder.

What is claimed is:

1. In a power cylinder having an annular cylinder side wall and an end wall and a power transfer rod reciprocably extending through said end wall, a seal assembly comprising:

a diaphragm seal having a center opening defined by an annular axially extending inner lip having a frusto-conical inner surface in free form, a radially extending disc body operatively engaging said end wall, and an outer peripheral seal lip extending axially from the disc body in the same axial direction as said lip and terminating in an annular rolled edge contacting said cylinder side wall in sealing relation;

and an annular seal expander having inner and outer peripheral flanges and a disc body joining said flanges, said inner flange being frusto-conical and positioned in radially outward spaced juxtaposed relation to said seal inner lip, said outer flange extending axially to provide radially outward acting support force holding said seal rolled edge in sealing engagement with said cylinder side wall, said outer flange terminating in a radially outward extending section in axially spaced relation with said seal rolled edge;

said cylinder side wall having a shoulder thereon adjacent to and of a smaller diameter than said expander outer flange radially outward extending section and normally axially spaced therefrom on the side thereof opposite said seal rolled edge and providing a limit stop against movement of said seal expander in one direction.

2. A hydraulic power cylinder end wall seal arrangement for a power cylinder having a cylinder side wall, a piston reciprocably mounted therein, a piston force output rod, a cover forming an end wall secured to one end of said cylinder side wall and having said output rod reciprocably extending therethrough, and a piston return spring acting on said piston and operatively against said end wall, said seal arrangement comprising:

a recess in the inner face of said end wall surrounding said rod and having received therein a first annular seal having an inner frusto-conical lip sealing and wiping said output rod, and outer frusto-conical lip sealing against the recess side wall, and circumferentially spaced lip segments extending axially out of said recess radially intermediate said inner and outer lips;

a groove in the inner face of said end wall communicating with said recess and providing a fluid drain path for hydraulic fluid wiped from said output rod by said first annular seal;

a seal support plate covering the inner face of said end wall and said recess and said groove and engaging said intermediate cylindrical lip segments to retain said first annular seal in said recess;

a diaphragm-like second annular seal having an inner frusto-conical lip sealing said output rod, an outer cylindrical lip terminating in an outwardly rolled edge sealing said cylinder side wall and a disc section joining said lips;

and an annular seal expander having an inner frusto-conical flange fitting over said second annular seal inner frusto-conical lip in juxtaposed but spaced relation, an outer flange extending axially to provide radial support for said seal outwardly rolled edge and then extending radially outward toward said cylinder side wall, and a body section joining said flanges and in surface engagement with said second annular seal disc section and providing a spring seat for said piston return spring, the force exerted by said piston return spring being transmitted to said cylinder end wall through said seal expander and said second annular seal and said seal support plate.

* * * * *